United States Patent
Gasparini et al.

(10) Patent No.: US 12,301,093 B2
(45) Date of Patent: May 13, 2025

(54) DC-DC CONVERTER APPARATUS WITH TIME-BASED CONTROL LOOP AND CORRESPONDING CONTROL METHOD, AND COMPUTER PROGRAM PRODUCT

(71) Applicant: STMicroelectronics S.r.l., Agrate Brianza (IT)

(72) Inventors: Alessandro Gasparini, Cusano Milanino (IT); Alessandro Bertolini, Vermiglio (IT); Mauro Leoncini, Agrate Brianza (IT); Massimo Ghioni, Monza (IT); Salvatore Levantino, Milan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 18/758,327

(22) Filed: Jun. 28, 2024

(65) Prior Publication Data

US 2024/0356443 A1 Oct. 24, 2024

Related U.S. Application Data

(62) Division of application No. 17/569,296, filed on Jan. 5, 2022, now Pat. No. 12,062,981.

(30) Foreign Application Priority Data

Jan. 7, 2021 (IT) .......................... 102021000000245

(51) Int. Cl.
H02M 3/158 (2006.01)
H02M 1/00 (2006.01)

(52) U.S. Cl.
CPC ....... *H02M 1/0025* (2021.05); *H02M 1/0009* (2021.05); *H02M 3/158* (2013.01)

(58) Field of Classification Search
CPC .. H02M 3/158; H02M 1/0009; H02M 1/0025; H02M 3/157
See application file for complete search history.

(56) References Cited

U.S. PATENT DOCUMENTS 9,793,800 B1 * 10/2017 Yan ........................ H02M 3/157
2012/0153917 A1 6/2012 Adell et al.
(Continued)

OTHER PUBLICATIONS

IT Search Report and Written Opinion for priority application IT 102021000000245, report dated Aug. 30, 2021, 8 pages.
(Continued)

*Primary Examiner* — Alex Torres-Rivera
(74) *Attorney, Agent, or Firm* — Crowe & Dunlevy LLC (57) ABSTRACT

A time based boost DC-DC converter generates an output voltage using an inductor. A voltage error between the output voltage and a reference voltage is determined and processed in a) an integral control branch which converts the voltage error into an integral control current signal used to control a current controlled oscillator, and b) a proportional branch which converts the voltage error into a proportional control current signal used to control signal a delay line. Current flowing in the inductor is sensed, attenuated and used to apply adjustment to the integral and proportional control current signals. The output from the current controlled oscillator is passed through the delay line and phase detected in order to generate pulse width modulation (PWM) control signaling driving switch operation in the converter.

20 Claims, 4 Drawing Sheets

(56) References Cited

U.S. PATENT DOCUMENTS

2018/0048232 A1   2/2018  Adell et al.
2021/0376730 A1* 12/2021  Yan .................... H02M 3/1584
2022/0190720 A1   6/2022  Park et al.

OTHER PUBLICATIONS

Paduvalli Vikas V et al: "Mitigation of Positive Zero Effect on Nonminimum Phase Boost DC-DC Converters in CCM", IEEE Transactions on Industrial Electronics, IEEE Service Center, Piscataway, NJ, USA, v01. 65, No. 5, May 1, 2018 (May 1, 2018), pp. 4125-4134, XP011676036.

Seong Joong Kim et al: "High Frequency Buck Converter Design Using Time-Based Control Techniques", IEEE Journal of Solid-State Circuits, v01. 50, No. 4, Apr. 1, 2015 (Apr. 1, 2015), pp. 990-1001, XP055727308, USA.

Weiwei Huang et al: "A novel current sensing circuit for Boost DC-DC converter", Anti-Counterfeiting, Security and Identification (ASID), 2012 International Conference On, IEEE, Aug. 24, 2012 (Aug. 24, 2012), pp. 1-4, XP032247568, DOI: 10.1109/ICASID.2012.6325314.

* cited by examiner

DC-DC CONVERTER APPARATUS WITH TIME-BASED CONTROL LOOP AND CORRESPONDING CONTROL METHOD, AND COMPUTER PROGRAM PRODUCT

CROSS REFERENCE TO RELATED APPLICATIONS

This application is a divisional of U.S. patent application Ser. No. 17/569,296, filed Jan. 5, 2022, which claims the priority benefit of Italian Application for Patent No. 102021000000245, filed on Jan. 7, 2021, the contents of which are hereby incorporated by reference in their entireties to the maximum extent allowable by law.

TECHNICAL FIELD

Embodiments of the present disclosure relate to solutions for a DC-DC converter apparatus with time-based control loop.

Embodiments of the present disclosure relate in particular to applications such as a DC-DC boost converter for an AMOLED display application.

BACKGROUND

In DC-DC converters using a pair or network of switching transistors driven by a Pulse Width Modulated (PWM) signal, time-based approaches use the occurrences of rising edges of binary signals as variables inside the control loop. The advantage of this approach, compared to a voltage-based one, is a lower area occupation and lower power consumption. The performance gap between the two approaches further increases as the reference frequency of the converter increases. This last difference expresses the true potential of the time-based approach: it takes advantage of the natural technology shrinking of the CMOS process using digital signals instead of analog ones inside the control loop; and a fully integrated DC-DC converter exploits lower filter inductance and capacitance values. In order to maintain the same output voltage ripple, the reference frequency of the converter must increase to tens of MHz. While this change does not introduce any issues in the time-based control loop sizing, it directly impacts the Voltage-based one with an increase of the error-Amplifier (EA) bandwidth (power consumption).

The validity of such approach has already been demonstrated for instance in the context of a High-Frequency CMOS Buck-Converter.

Ideally, the time-based architecture can used also in the control loop of the boost converter achieving the same advantages. In reality, however, due to its non-minimal phase nature, the maximum achievable bandwidth of the boost converter is often limited by the presence of a Right-Half-Plane (RHP) zero $1/\tau_z$ inherently present in the control to output transfer function. A function $T_{control-to-out}(s)$ representing a control loop for a boost converter can be written as:

$$T_{control-to-out}(s) = \frac{V_{out}}{1-D} \frac{(1-s\tau_z)}{\frac{s^2}{\omega_0^2} + \frac{s}{Q\omega_0} + 1} \quad (1)$$

where $V_{out}$ indicates the output voltage signal, D indicates the duty-cycle, Q indicates the filter quality factor and $$\omega_0 = \frac{1-D}{\sqrt{LC_0}}$$

is the filter natural frequency. The term at the numerator is a right-half-plane (RHP) zero $1/\tau_z$ whose value depends on the inductance L, load $R_{load}$ and duty cycle D of the converter, as indicated herebelow:

$$\tau_z = \frac{L}{(1-D)^2 R_{load}} \quad (2)$$

The equation (2) also indicates that the value of the time constant $\tau_z$ of such a zero becomes larger as the load of the converter increases. Moreover, it is important to specify that this additional term only exists when the converter works in PWM mode.

The maximum bandwidth of the system should respect the following two inequalities:

$$BW_{max} \ll \frac{1}{2\pi\tau_z} \quad (3a)$$

$$BW_{max} \ll f_{sw} \quad (3b)$$

where $BW_{max}$ indicates a maximum achievable bandwidth, and where $f_{sw}$ indicates a PWM switching frequency. In LED display application, the current capability required is such that the first term is always limiting with respect to the second one. Considering a standard proportional, integral, derivative (PID) compensation network, with a transfer function:

$$T_{PID}(s) = \frac{K_{PID}(1+s\tau_{zl})(1+s\tau_{zh})}{s(1+s\tau_{p1})(1+s\tau_{p2})}, \quad (4)$$

where $\tau_{zl}$ and $\tau_{zh}$ indicate time constants of two zeroes, $\tau_{p1}$ and $\tau_{p2}$ indicate time constants of the high frequency poles and $K_{PID}$ indicates a PID DC gain. To fulfill the requirement in equation (3a), the design of the PID network would require high values of the time constants $\tau_{zh}$ and $\tau_{zl}$ of the zeroes. To meet these constraints, in the time-based implementation, it is necessary to design voltage/current controlled delay lines with large gains. The problem is that the gain is proportionally related with the delay that the component must introduce. To obtain large delays with delay lines it is required either to introduce a large number of stages in series or to increase the propagation delay of the cell with a capacitance in series to the output. Both of these solutions come with the price of increases in both occupied area and power consumption which spoils most of the advantages of the time-based implementation with respect to the standard voltage-based one.

To get back to the full advantages of the time-based implementation it is thus necessary to overcome the limitation introduced by the RHP zero in equation (3a).

A solution to eliminate the RHP zero has been presented by Paduvalli, et al., "Mitigation of Positive Zero Effect on Nonminimum Phase Boost DC-DC Converters in CCM", IEEE TIE, May 2018 (incorporated by reference). In this publication it is shown that the transfer function $T_{control-to-inductor}(s)$ from the duty-cycle D to the inductor current can be expressed as:

$$T_{control-to-inductor}(s) = \frac{2V_{out}}{R_{load}(1-D)^2} \frac{(1+s\tau'_z)}{\frac{s^2}{\omega_0^2} + \frac{s}{Q\omega_0} + 1} \quad (5)$$

where a time constant $\tau_z'$ of the zero at the numerator can be written as:

$$\tau'_z = \frac{R_{load}C_0}{2}, \quad (6)$$

where $C_0$ indicates an output filter capacitance.

In this publication it is envisaged to sum the transfer function $T_{control-to-out}(s)$ with the transfer function $T_{control-to-inductor}(s)$ before feeding it to the compensation network. In order to sum the two transfer function components, it is necessary to introduce a conversion factor $R_T$ which has the dimension of a transconductance. The input signal $V_{in\ comp}(s)$ of the compensation network is therefore now:

$$V_{in\ comp}(s) = \frac{R_T \cdot T_{control-to-inductor}(s) + T_{control-to-out}(s)}{n} \quad (7)$$

where n indicates an attenuation given by the voltage partition between the filter output and the compensation network input. Solving equation (7), the following equation is obtained:

$$V_{comp\ in}(s) \approx \frac{1}{n} \cdot \frac{V_{out}}{(1-D)} \frac{1 - s\left(\frac{L}{R_{load}(1-D)^2} - \frac{R_T C_0}{(1-D)}\right)}{\left(1 + \frac{s}{Q\omega_0} + \frac{2^2}{\omega_0^2}\right)} \quad (8)$$

Figure 1:
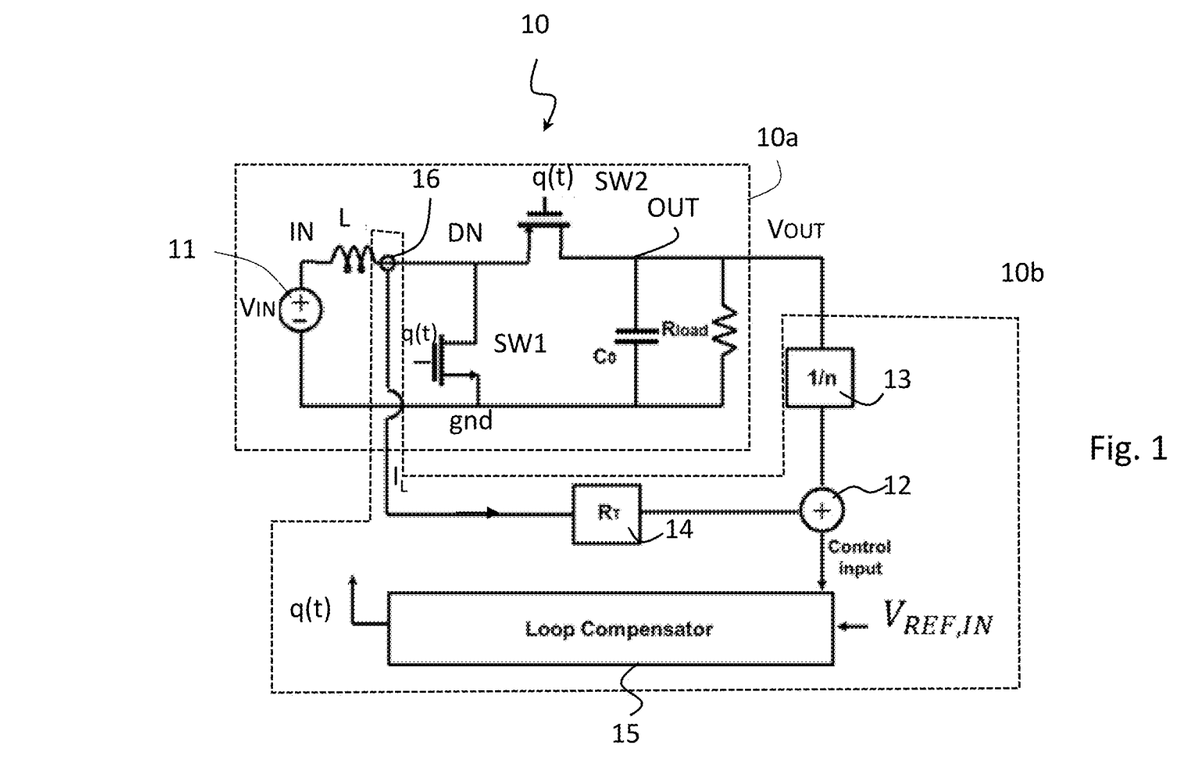
FIG. 1 is a schematic representation of a DC-DC boost converter.

FIG. 1 shows a schematic representation of a DC-DC boost converter 10 operating with such a sum of the transfer functions. An input voltage generator 11 supplies an input voltage Vin to an input terminal IN of the series inductor or boost inductor L. The other terminal DN of the boost inductor L is coupled to ground GND by a first controlled switch SW1 (e.g., a MOS transistor), and coupled through a second controlled switch SW2 to the output node OUT, to which is coupled a terminal of an output capacitor $C_0$, or filter capacitor, coupled to ground GND by its other terminal and coupled in parallel with a load resistance $R_{load}$, on which the output voltage $V_{out}$ is taken. Both controlled switches SW1 and SW2 are driven by a PWM driving signal q(t) with steady-state duty cycle D. The components described so far represent a known boost DC-DC converter circuit arrangement 10a, which substantially thus includes a boost inductor L in series with a voltage generator 11 providing an input voltage Vin to said boost inductor L and an output capacitor Co in parallel with an output load $R_{load}$, a first switch SW1 coupling the output of the boost inductor L to ground when closed and a second switch SW2 coupling the output of the boost inductor L to the output node of the converter 10 when closed, said first and second switch SW1, SW2, being controlled by a PWM driving signal q(t) to operate opposite opening and closing states (i.e., when SW1 is open SW2 is closed and vice versa). In the converter 10 this is obtained using a nMOS as switch SW1 and a pMOS as switch SW2, although this can be obtained by other means (e.g., using same type MOS switches and inverting the driving signal q(t) controlling one of the switches).

In order to compensate for the RHP, the DC-DC converter 10 further includes a control loop 10b coupled to the voltage output Vout, which represents the controlled quantity, and providing said PWM driving signal q(t) at its output as the control signal. A sum block 12 has a summing input receiving the inductor current $I_L$, taken through a current sensor 16, which can be also a simple branch coupled to the downstream terminal (i.e., node DN) of the boost inductor L, through a transimpedance block 14 (i.e., a transconductance amplifier) applying a conversion factor (i.e., transimpedance, $R_T$), and a summing input receiving the output voltage $V_{out}$ through a block 13 dividing it by the attenuation n. The output of the sum block 12 represents the input signal $V_{in\ comp}(s)$, as per equation (7), of the loop compensation network 15 which receives also a reference input voltage $V_{REF,IN}$ and generates the driving signal q(t), implementing equation (4).

Looking at the numerator of equation (8), the magnitude and the sign of the term inside the parenthesis depends on the value selected for the transimpedance $R_T$. If the value is large enough, the term becomes negative meaning that the zero is shifted into the left plane and can be used to compensate the output filter complex pole pair. In particular, the time constant can be designed to be equal to $\tau_{z1}$. Doing so, the compensation network 15 can be reduced from the PID in equation (4) to a PI such that:

$$T_{PID}(s) = \frac{K_{PID}(1+s\tau_{z2})}{s(1+s\tau_{p1})(1+s\tau_{p2})} \quad (9)$$

The main disadvantage of the RHP zero mitigation technique described above is that it inherently introduces a tracking error at the output of the converter. This error exists since the reference input of the feedback network is compared with the sum between the inductance current and the scaled output voltage:

$$V_{REF,IN} = \frac{V_{OUT}}{n} + R_T I_L, \quad (10)$$

where $I_L$ is the average inductance current. Starting from equation (10) it is possible to highlight the output tracking error $V_\epsilon$:

$$|V_\epsilon| = \frac{|V_{OUT} - nV_{REF,IN}|}{nV_{REF,IN}} = \frac{nR_T I_L}{nV_{REF,IN}}. \quad (12)$$

The magnitude of this output tracking error $V_\epsilon$ is proportional to the transimpedance value $R_T$ and to the average inductance current $I_L$. Considering that the maximum load current of large LED display can reach the ampere range and that the value of the transimpedance $R_T$ has been chosen large to move the RHP zero into the left plane, the overall error value could easily exceed some percent of the ideal output voltage. Such a high value is unacceptable in the application and has to be corrected.

In the publication by Paduvalli, et al., cited above, a correction method is proposed which uses a high pass filter (HPF) in series with the inductor current sensor that will eliminate the DC value of the inductor current (which is responsible of the tracking error) while preserving the frequency information (that is used to eliminate the RHP zero). For the solution to hold, the bandwidth of the HPF ($\omega_{HPF}$) must be selected lower than the frequency of the zero generated by the RHP zero mitigation technique. This means that, even if the steady state error is compensated, the transient response of the boost converter is severely degraded since the error will fully show up during fast line and load variations recovering with a very slow exponential tail with time constant $1/\omega_{HPF}$.

On the basis of the foregoing description, there is a need in the art for solutions which overcome one or more of the previously outlined drawbacks.

SUMMARY

Embodiments herein concern an apparatus. Embodiments moreover concern a related control method as well as a corresponding related computer program product, loadable in the memory of at least one computer and including software code portions for performing the steps of the method when the product is run on a computer. As used herein, reference to such a computer program product is intended to be equivalent to reference to a computer-readable medium containing instructions for controlling a computer system to coordinate the performance of the method. Reference to "at least one computer" is evidently intended to highlight the possibility for the present disclosure to be implemented in a distributed/modular fashion.

As mentioned in the foregoing, the present disclosure provides solutions regarding a time based boost DC-DC converter apparatus operating in a PWM mode, said time based boost DC-DC converter apparatus comprising a DC-DC boost converter architecture comprising a boost inductor arranged in series with a voltage generator providing an input voltage to said boost inductor and an output capacitor coupled to an output node in parallel with an output load, and a switching network configured to selectively couple the output of the boost inductor to the output node under the control of a PWM driving signal. Said time based boost DC-DC converter apparatus comprises: a time based control loop coupled to the voltage output and providing said PWM driving signal at its output, said time based control loop configured to perform a voltage to time conversion of a voltage error between an output voltage and a reference voltage and to generate said PWM driving signal on the basis of said voltage to time conversion of an error between an output voltage and a reference voltage. Said time based control loop comprises: an integral control branch configured to convert said voltage error into an integral control current signal, which is used to obtain a control signal of a current controlled oscillator, supplying a first signal, on which frequency the switching frequency of the PWM driving signal depends, in particular corresponds to, operating with a first phase depending on said integral control current signal; and a proportional branch configured to convert said voltage error into a proportional control current signal which is used to obtain a control signal of a delay line, receiving at its input said first signal operating with a first phase, configured to sum in said first signal a second phase depending on said proportional control current signal to obtain a time signal. The time signal is supplied to a phase detector configured to output a switching voltage which duty cycle depends from the phase of the time signal, in its turn supplied to a driver circuit to control the generation of said driving PWM signal driving the switching network of said DC-DC boost converter architecture. The converter is configured to obtain said control signal of said current controlled oscillator and said control signal of said a delay line by taking a current flowing in the boost inductor and by, respectively, multiplying said current flowing in the boost inductor by a first attenuation value to obtain a first compensation current which is summed to said proportional control current signal, and multiplying said current flowing in the boost inductor by a second attenuation value to obtain a second compensation current which is summed to said integral control current signal. The converter is further configured to estimate a DC component of the current flowing in the boost inductor and to subtract said DC component of the current flowing in the boost inductor multiplied by the first attenuation value from the first compensation current signal and multiplied by the second attenuation value from the second compensation current signal.

In variant embodiments, the solution here described may include that said converter is configured to: sum said current flowing in the boost inductor multiplied by the first attenuation value or by the second attenuation value by injecting it in a respective node of said branch or integral branch to which said proportional control current signal or integral control current signal is brought; and to subtract said DC component of the current flowing in the boost inductor multiplied by the first attenuation value or by the second attenuation value by injecting it in a respective node to which said first compensation current signal or said second compensation current signal is brought.

In variant embodiments, the solution described herein may include that said DC component of the current flowing in the boost inductor is estimated on the basis of the current flowing in the load of the DC-DC converter, divided by the efficiency of the converter and by one minus the duty cycle of the driving signal of the converter.

In variant embodiments, the solution described herein may include that said proportional branch includes a first differential transconductance amplifier configured to convert the voltage error in said first current signal by multiplying it by a proportional transconductance value for output on a differential output of the first differential transconductance amplifier. The DC component multiplied by the first attenuation value is summed on one of the differential outputs and subtracted from the other differential outputs and said integral branch includes a second differential transconductance amplifier configured to convert the voltage error in said second current signal by multiplying it by an integral transconductance value for output on a differential output of said second differential transconductance amplifier. The DC component multiplied by the second attenuation value is summed on one of the differential outputs and subtracted from the other differential outputs.

The current controlled oscillator comprises two current controlled oscillators controlled by said integral differential outputs and supplying respective two delay lines controlled by said proportional different outputs, the output signal of said two delay lines being brought to said phase detector, which is configured to generate said switching voltage at said switching frequency and with a duty cycle proportional to their phase difference.

In variant embodiments, the solution described herein may include that said load current is estimated by a sensor applying a variable gain to the load current proportional to the inverse of one minus the duty cycle.

In variant embodiments, the solution described herein may include that said current sensing circuit comprises two cascoded mirror arrangements which common input is coupled to the output of a current generator supplying a bias current and which output branches are coupled respectively to the input and to the output of a further current mirror, at which output is also formed an output signal of the sensing circuit, terminals of said sense resistance being coupled, to respectively each of said two cascoded mirror arrangements, in particular to their output nodes, said load sensor further comprising a compensation arrangement comprising a compensation transistor being coupled to the output node of one of the cascaded mirror arrangements to supply a compensation current.

In variant embodiments, the solution here described may include that said load sensor includes a switching network, operating under a control signal operating at the switching frequency with said duty cycle, selectively coupling said compensation arrangement, to said output node.

In variant embodiments, the solution here described may include that said load sensor includes a bias current generator coupled to the output terminal of the first cascoded mirror arrangement to supply a further bias current and a further switching network driven by the same control signal operating at the switching frequency with said duty cycle driving said first switching network, selectively coupling said bias current generator to said output terminal, so that the further bias current and the compensation current are coupled to said output terminal in the same time intervals.

The present disclosure provides also solutions regarding a method for controlling a time based boost DC-DC converter apparatus operating in a PWM mode of any of the above described embodiments wherein said method includes: obtaining said control signal of said current controlled oscillator and said control signal of said a delay line by taking a current flowing in the boost inductor and by, respectively, multiplying said current flowing in the boost inductor by a first attenuation value to obtain a first compensation current which is summed to said proportional control current signal, multiplying said current flowing in the boost inductor by a second attenuation value to obtain a second compensation current which is summed to said integral control current signal, estimating a DC component of the current flowing in the boost inductor, and subtracting said DC component of the current flowing in the boost inductor multiplied by the first attenuation value from the first compensation current signal and multiplied by the second attenuation value from the second compensation current signal.

In variant embodiments, the method may include: summing said current flowing in the boost inductor multiplied by the first attenuation value or by the second attenuation value by injecting it in a respective node of said proportional branch or integral branch to which said proportional control current signal or integral control current signal is brought, and subtracting said DC component of the current flowing in the boost inductor multiplied by the first attenuation value or by the second attenuation value by injecting it in a respective node to which said first compensation current signal or said second compensation current signal is brought.

In variant embodiments, the method may include estimating said DC component of the current flowing in the boost inductor on the basis of the current flowing in the load of the DC-DC converter architecture, divided by the efficiency of the converter and by one minus the duty cycle of the driving signal of the converter.

The present disclosure also provides solutions regarding a computer-program product that can be loaded into the memory of at least one processor and comprises portions of software code for implementing the method of any of the previous embodiments.

BRIEF DESCRIPTION OF THE DRAWINGS

Embodiments of the present disclosure will now be described with reference to the annexed drawings, which are provided purely by way of non-limiting example and in which.

DETAILED DESCRIPTION

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification is not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figures parts, elements or components which have already been described with reference to FIG. 1 are denoted by the same references previously used in such Figures; the description of such previously described elements will not be repeated in the following in order not to overburden the present detailed description.

Figure 2:
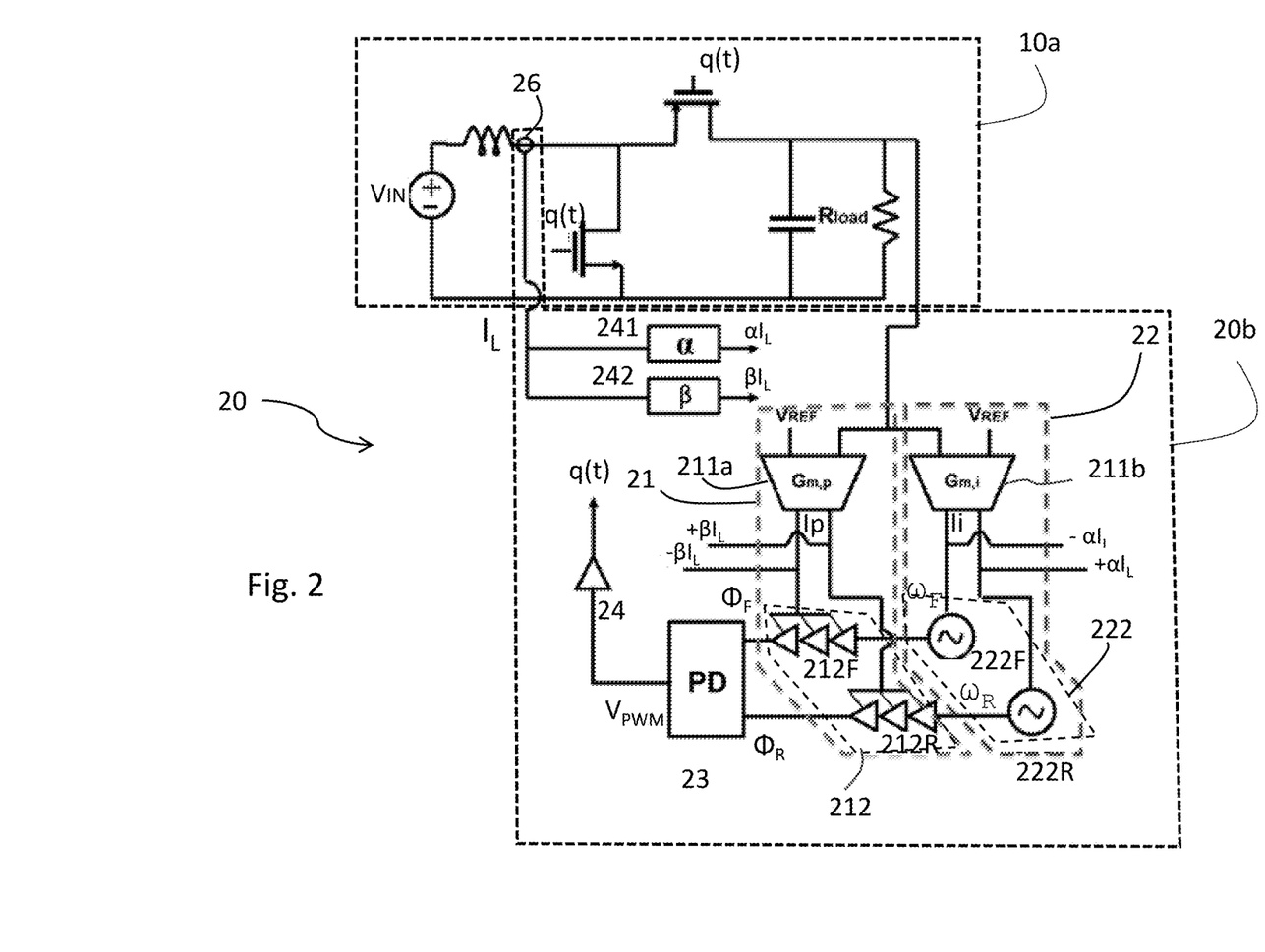
FIG. 2 shows a partial schematic representation of a DC-DC boost converter.

FIG. 2 schematically shows a time-based boost converter 20. The components and quantities indicated with the same references with respect to FIG. 1 perform the same function, thus it can be seen that the standard structure of the boost converter 10a is substantially the same.

The inductor current IL, however, is taken for instance through a current sensor 26 to two multiplication blocks 241, 242 that, in parallel, multiply the inductor current $I_L$ respectively by a first conversion gain $\alpha$, in the conversion block 241, obtaining a first converted current $\alpha I_L$, and by a second conversion gain $\beta$, in the conversion block 242, obtaining a second converted current $\beta I_L$. The output voltage $V_{OUT}$ in the same way is applied in parallel to two circuit paths, a proportional path 21 and an integral path 22.

At the input of the proportional path 21, the output voltage $V_{OUT}$ is fed to a transconductance block 211a, which receives also a reference voltage $V_{REF}$. The block 211a multiplies a difference between the voltages by a transconductance $G_{m,p}$, outputting a differential proportional current Ip on two respective feedback and reference output branches, which are fed to a Current-Controlled-Delay-Line (CCDL) 212, to generate the proportional gain. The output of the transconductance block 211a is differential on two branches so that on the reference branch the differential component of the differential proportional current Ip is summed with the second converted current $\beta I_L$, and on the feedback branch from the differential component of the differential proportional current Ip is subtracted the second converted current $\beta I_L$. The two differential branches are then fed as control signals of two respective feedback Current-Controlled-Delay-Line 212F and reference Current-Controlled-Delay-Line 212R in block 212.

At the input of the integral path 22, the output voltage $V_{OUT}$ is fed to a transconductance block 211b, which receives also the reference voltage $V_{REF}$. The block 211b multiplies a difference between the voltages by a transconductance $G_{m,i}$, outputting a differential integral current Is also on two respective feedback and reference output branches, which are fed to a Current-Controlled-Oscillator (CCO) 222, to generate the integral gain. The free running frequency of the Current-Controlled-Oscillator (CCO) 222 sets the switching frequency $f_{sw}$ of the driving signal q(t), which frequency value preferably corresponds or depends on the frequency of the signal at the output of the Current-Controlled-Oscillator (CCO) 222, in particular corresponds to the switching frequency. Specifically, the switching frequency $f_{sw}$ corresponds to the frequency of the CCO 222 either during startup or steady state. The output of the transconductance block 221b is also differential on two branches so that on the reference branch the differential component of the differential integral current II is summed with the first converted current $\alpha I_L$, and on the feedback branch from the differential component of the differential integral current $I_I$ is subtracted the first converted current $\alpha I_L$. The signals on the two differential branches are then fed as control signals of two respective feedback and reference Current-Controlled-Oscillators 222F and 222R in block 222, which output respectively a signal at feedback frequency $\omega_F$ and a signal at reference frequency @R.

The output of the two Current-Controlled-Oscillators 222F and 222R (i.e., a signal at feedback frequency $\omega_F$ and a signal at reference frequency $\omega_R$) are fed respectively to the input of the respective Current-Controlled-Delay-Lines 212F and 212R.

The output of the Current-Controlled-Delay-Lines 212F and 212R is fed to a phase detector 23 which, through a driver 24, supplies the PWM driving signal q(t). The phase detector 23 is configured to generate a voltage waveform $V_{PWM}$ having a duty cycle that is proportional to the difference of two input phases.

The phase detector 23 may be embodied for instance simply by an RS (Set Reset) latch with pulse generators at its inputs. The pulse generators generate narrow pulses on every positive edge transition of their inputs, resulting in RS flip-flop-like behavior for the phase detector 23. The duty-cycle of the pulse width modulated signal $V_{PWM}$ is set at every positive edge of the feedback, or control, phase $\Phi_F$, and reset at every positive edge of the reference phase $\Phi_R$. Consequently, the duty-cycle of the signal (i.e., the $V_{PWM}$ waveform) is proportional to the difference of two phases.

Therefore, basically, the time-based control loop 20b includes a voltage-to-time converter, represented by paths 21 and 22, that converts an error voltage, i.e. $V_{OUT}-V_{REF}$, into a time signal (i.e., a signal at feedback frequency $\omega_F$ and a signal at reference frequency $\omega_R$ with respective feedback, or control, phase $\Phi_F$ and reference phase $\Phi_R$) and performs by the blocks 221 and 222 a time-based compensation, specifically a proportional integral compensation, then using a phase detector 23 to compare the reference time based signals ($\omega_R$, $\Phi_R$) and ($\omega_F$, $\Phi_F$) generating a time output in the form of a pulse-width modulated voltage $V_{PWM}$ with variable duty cycle D according to such phase difference between feedback, or control, phase $\Phi_F$ and reference phase $\Phi_R$, which drives, as driving signal q(t) the boost converter arrangement 10a.

In other words, the time-based control loop 20b includes a voltage-to-time converter, where the specific conversion from electrical quantity to time is performed by the delay lines 212F, 212R and oscillators 222F, 222R. The transconductances $G_{m,p}$ and $G_{m,i}$ in the two paths 21, 22 perform a conversion from voltage to current, which is helpful because it allows to sum different currents (i.e., the ones output from the transconductance itself with the ones from the inductor sensor and load sensor) without any additional hardware.

As far as the compensation is concerned, it is indeed distributed along the integral or proportional path 21, 22 determining the transfer function. The integral and proportional gains of such paths 21, 22 are obtained by the product of all the blocks in cascade with the signal path, which means that both the transconductance gain $G_{m,p}$, $G_{m,i}$, the oscillators 222F, 222R and the delay lines 212F, 212R are part of the compensation of the voltage error signal $V_{OUT}-V_{REF}$. Blocks 241, 242 introducing the two conversion gains $\alpha$, $\beta$, the oscillators 222F, 222R and the delay lines 212F, 212R are part of the compensation for the current signals.

Using current-controlled devices such as transconductance amplifiers 211a and 211b is helpful since the inductance current $I_L$ can be injected directly into a circuit node at their output without using any voltage adder. Therefore, it is possible to define the two conversion gains $\alpha$, $\beta$ as:

$$\alpha = R_T G_{m,i} \tag{13a}$$

$$\beta = R_T G_{m,p} \tag{13b}$$

such that the conversion gains may be obtained as the product of the transimpedance $R_T$ of converter 10 and the respective transconductance of the time-based control loop 20b.

It has to be also noted that the so obtained conversion gain $\alpha$, $\beta$ is now adimensional, meaning that it can be obtained from the inductor current sensor 16 using simple current mirrors, with a corresponding mirroring ratio.

The integral gain is generated with a transconductance ($G_{m,i}$) and a Current-Controlled-Oscillator (CCO), whereas the proportional path is composed by a transconductance ($G_{m,p}$) and a Current-Controlled-Delay-Line (CCDL). The differential structure of feedback and reference branches is used to eliminate the dependence of the steady state PWM frequency with the target output voltage and to increase the loop gain by a factor 2, as indicated by Kim, et al., "High Frequency Buck Converter Design Using Time-Based Control Techniques," IEEE JSSC, April 2015 (incorporated by reference).

Figure 3:
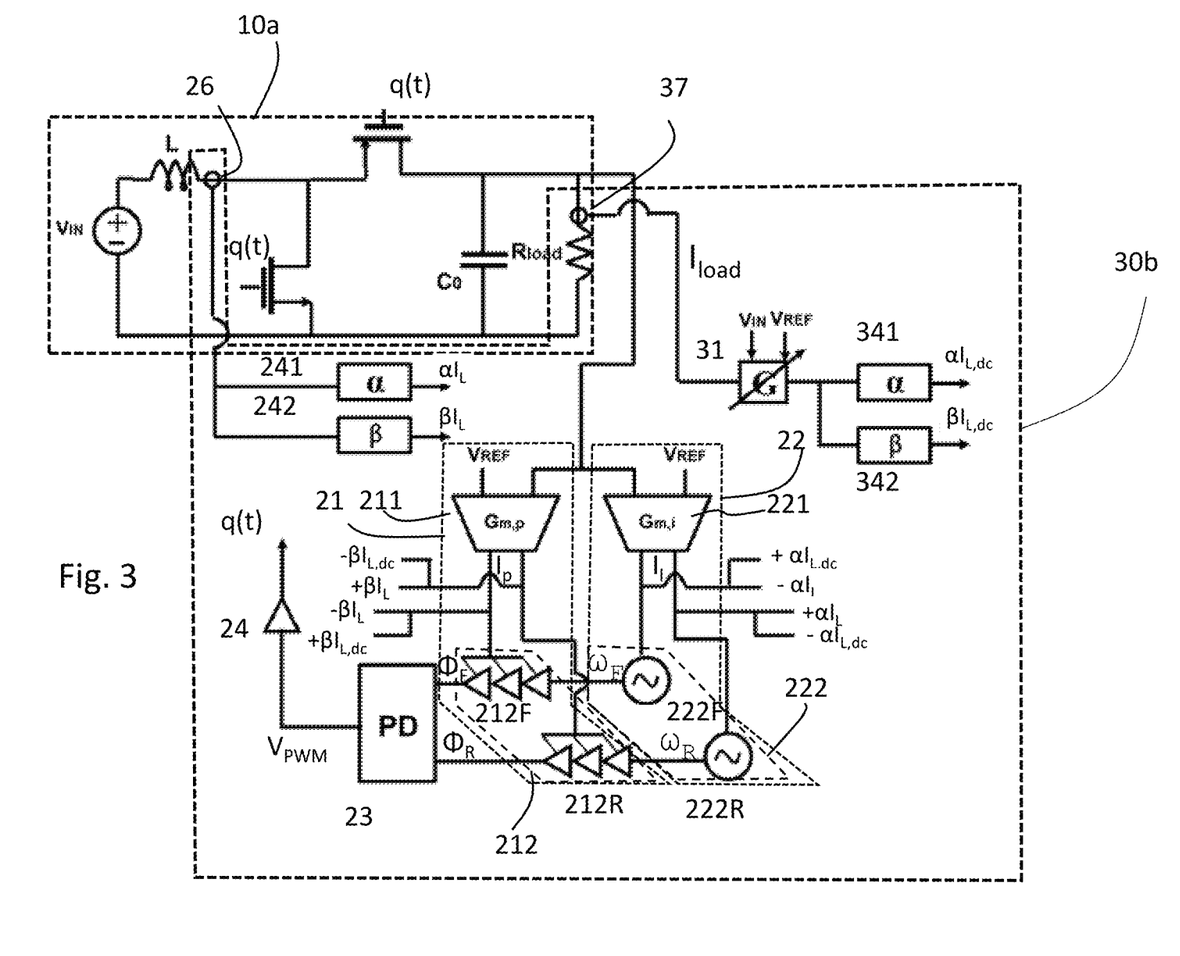
FIG. 3 shows a schematic representation of a converted architecture.

FIG. 3 schematically shows the complete architecture of the converter. With reference to the boost converter 20 of FIG. 2, the present solution relies on the observation that to mitigate the RHP zero it is necessary to address the AC component of the inductor current, whereas the tracking error is determined by its DC component. The solution here described provides injecting the AC component of the inductor current only or to compensate for the DC part.

Injecting the AC component of the inductor current only may be difficult to obtain without any additional inductances and cannot be obtained directly from the inductance current without the insertion of some low frequency filtering that inevitably reduces the transient performance of the converter. A possible way to estimate the average inductance current value is via the load current, remembering that the relation between the two is:

$$I_L = \frac{I_{Load}}{(1-D)\eta}, \quad (14)$$

where $I_{load}$ indicates the load current and η indicates the converter efficiency. To implement the compensation, a load current sensor may be provided, and an estimation of the input to output ratio and of the efficiency has to be obtained.

Therefore, the circuit arrangement 30 corresponds to the arrangement 20 of FIG. 2, but includes a further current sensor, a load current sensor 37 which measures the current flowing in the load $R_{load}$, applying a variable gain in a variable gain block 31, receiving Vin and Vref, to the load current $I_{load}$ which depends on the duty cycle D. This divides the load current $I_{load}$ by 1−D and estimates the boost inductor current $I_L$ average value. An estimated boost inductor current average value $I_{L,dc}$ is multiplied by the first conversion value α and second conversion value β in respective conversion blocks 341, 342, then the resulting currents $\alpha I_{L,dc}$ and $\beta I_{L,dc}$ are subtracted from the first converted current $\alpha I_L$ and second converted current $\beta I_L$. This is performed by directly injecting the resulting currents $\alpha I_{L,dc}$ and $\beta I_{L,dc}$ with the appropriate sign on the differential branches at the outputs of the differential amplifiers 211, 221. Specifically, injecting the resulting currents $\alpha I_{L,dc}$ and $\beta I_{L,dc}$ so that on the branches of the integral path is injected $\alpha I_L - \alpha I_{L,dc}$ and $-(\alpha I_L - \alpha I_{L,dc})$ and on the branches of the proportional path is injected $\beta I_L - \beta I_{L,dc}$ and $-(\beta I_L - \beta I_{L,dc})$.

Thus, the variable gain at the output of the load current sensor 37 introduces a gain of $$G = \frac{1}{\eta(1-D)}.$$

The output is then scaled by the same gain used for the inductance current and subtracted, still by simple injection of the current in the nodes of the loop at the input of the blocks 221, 222, from the corresponding conversion current. Also, in this case, the conversion gains α and β are simply obtained with current mirrors, applying a corresponding mirroring ratio. Finally, it is important to note that the implementation of a negative sign in the injection of the current simply means that the current should be sunk from the node instead of injected.

The load current sensor 37 must be wide band so as to not degrade the converter transient response. To sense the load current in a fully integrated fashion it is possible to utilize a resistance in series with the output load. This resistance must be very small in order not to significantly reduce the efficiency.

Figure 4:
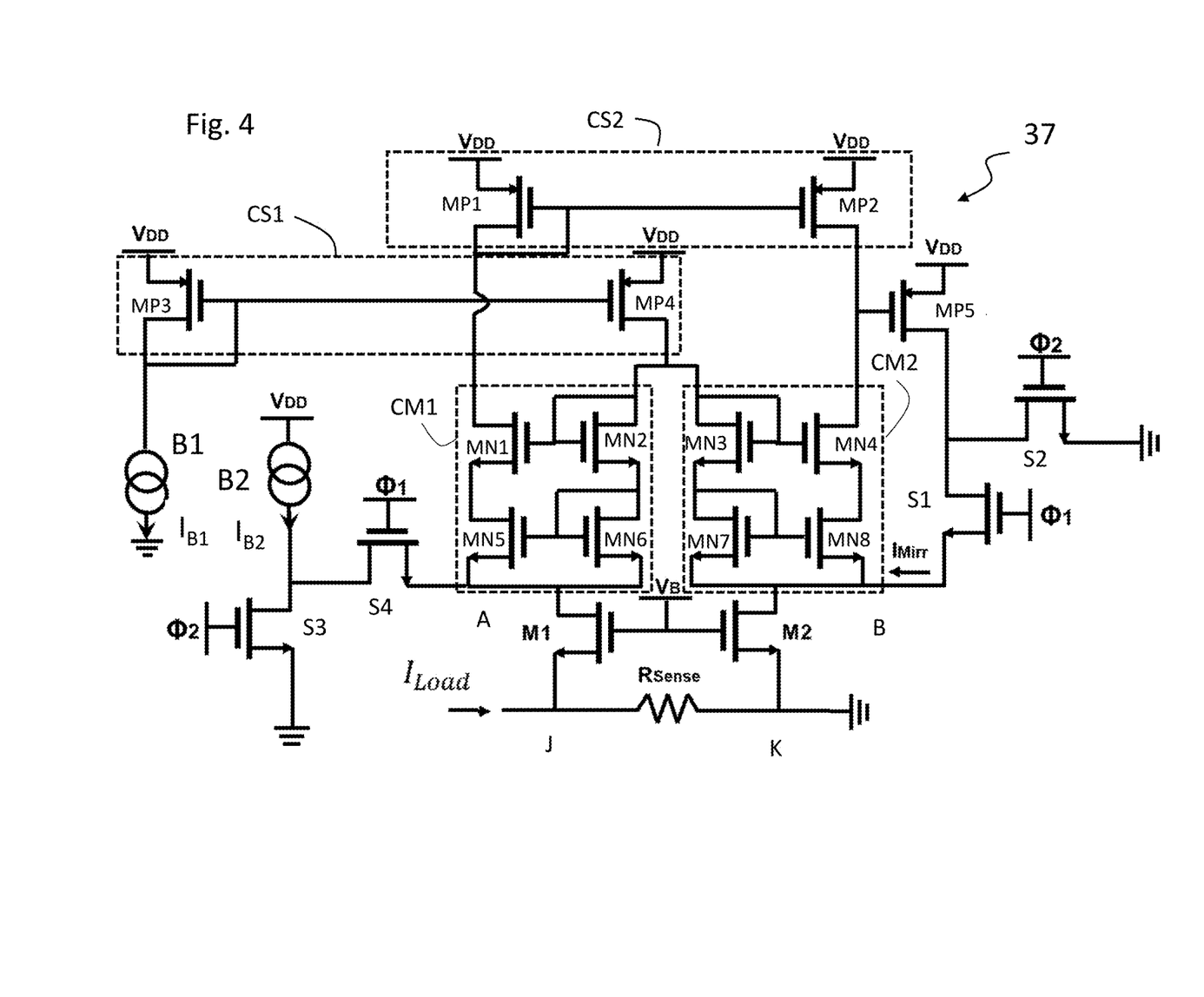
FIG. 4 shows a schematic representation of the circuit diagram of a sensor operating in the converter of FIG. 3.

FIG. 4 it is shown an embodiment of the load current sensor 37, which represents a modification of sensors of the type proposed by Huang, et al., "A novel current sensing circuit for Boost DC-DC converter," Anti-counterfeiting, Security, and Identification, Taipei, 2012, pp. 1-4 (incorporated by reference).

As shown in FIG. 4, the load current sensor 37 includes a sense resistance $R_{sense}$ which is placed in series on the path of the load current $I_{Load}$ to sense, in this case in series with the load. The sense resistance $R_{sense}$ has a first terminal J coupled to the load and receiving on the side of the load current $I_{load}$ and a second terminal K, in particular coupled to ground. The terminals J, K of the sense resistance $R_{sense}$ are respectively coupled to the sources of two nMOS M1 and M2 respectively, which gates are coupled together to a bias voltage $V_B$, in order to set a specific value of on-resistance, $r_{on}(M1)$ and $r_{on}(M2)$, with preferably $r_{on}(M1) = r_{on}(M2)$. In various embodiments, the two nMOS transistors M1 and M2 can be substituted by fixed resistances. Their sources are instead coupled respectively to two cascoded mirror arrangements CM1 and CM2 formed by nMOS transistors. The cascoded mirror arrangement CM1 includes an upper mirror formed by input transistor MN2, which is the input of the cascoded mirror arrangement CM1, and output transistor MN1. Here is followed the convention according to which the diode connected transistor represents the input transistor of the current mirror (that is, the transistor receiving the input current), which is copied to the other transistor (that is, the output transistor).

Then, a lower mirror, formed by the input transistor MN5 and output transistor MN6 is cascoded arranged below the upper mirror MN1, MN2. The sources of the upper input and output transistors are coupled to the drains of the respective lower input and output transistors. The sources of the lower input and output transistor MN5, MN6 are coupled to the drain of nMOS M1.

The other cascoded mirror arrangement CM2 correspondingly includes an upper mirror with input transistor MN3, and output transistor MN4, and a lower mirror with input transistor MN7, and output transistor MN8, coupled in the same way as the cascoded mirror arrangement CM1, the sources of the lower input and output transistor MN7, MN8 being coupled to the drain of nMOS transistor M2.

A current source CS1, obtained by a current mirror formed by pMOS input transistor MP3 and pMOS output transistor MP4 with their sources coupled to the supply voltage VDD and input coupled to a first bias current generator B1 generating a first bias current $I_{B1}$, feeds the inputs of the two cascoded mirror arrangements CM1, CM2 at the gates and drains of transistors MN2 and MN3, which are coupled together to the drain of the output transistor MP4. The outputs of the two cascoded mirror arrangements CM1 and CM2 are coupled respectively to the drain of an input transistor MP1 and to the drain of an output transistor MP2 of a further pMOS current mirror CS2, coupled to the supply voltage VDD by the sources of such pMOS transistors MP1, MP2.

A compensation pMOS transistor MP5 is coupled by its gate to the drain of the output transistor MP2, and to the output of the second cascoded mirror arrangement CM2 (drain of nMOS transistor MN4), while its drain is coupled, neglecting the interposition of switches S1 and S2 that will be described in the following, to a node B where the sources of transistors MN7 and MN8 and the drain of transistor M2 are coupled. The source of the compensation pMOS transistor MP5 is coupled to the supply voltage VDD. A compensation current $I_{Mirr}$ flows from the drain of the compensation pMOS transistor MP5 to node B.

All transistors MP1 and MP2, MP3 and MP4, MN1 and MN2, MN3 and MN4, MN5 and MN6, MN7 and MN8 are configured to determine 1:1 ratio symmetric current mirrors. The choice of symmetric current mirrors is to make the drain currents $I_d$ of such transistors equal (e.g., $I_d(MN5) = I_d(MN6) = I_d(MN7) = I_d(MN8)$).

When the load current $I_{Load}$ flows through the sense resistance Rsense, indicating its terminals as node J and K:

$$V_K = 0;$$

$$V_J = I_{Load} * Rsense \Rightarrow V_C \neq V_D$$

This makes the gate source voltage $V_{GS}$ of transistor MN5 lower than that of transistor MN8:

$$V_{GS}(MN8) > V_{GS}(MN5) \Rightarrow I_d(MN\,8) > I_d(MN5)$$

Thus, the voltage on a node E, $V_E$, which corresponds to the gate of the compensation pMOS transistor MP5 is:

$$V_E \approx -(gm(MN5) * V_A - gm(MN8) * V_B) * ro(MP2)$$

where gm indicates the transconductance of the MOS transistors and ro their drain resistance.

Thus, voltage $V_E$ becomes small, and a compensatory current $I_{Mirr}$ flows through transistor MP5 and M2, to make $V_A = V_B$.

$V_A$ and $V_B$ can be calculated by Ohm's law:

$$I_{Load} * R_{sense} + 2I_d(MN6) * r_{on}(M1) = 2I_d(MN7) * r_{on}(M2) + I_{Mirr} * r_{on}(M2),$$

where $$r_{on}(M1) = r_{on}(M2)$$

and $$I_d(MN6) = I_d(MN7),$$

thus:

$$I_{Load} * R_{sense} = I_{Mirr} * r_{on}(M2)$$

The feedback in the circuit force the following relationship $I_{Mirr} = (I_{Load} * R_{sense})/r_{on}(M2)$ where $r_{on}(M1) = r_{on}(M2)$ is the on resistance of the MOS pair.

Then, the sensor circuit arrangement includes two nMOS switched pairs, the first pair comprising a first switch S1 interposed on the branch coupling the drain of the compensation transistor MP5 to node B (i.e., on the branch where the compensation current $I_{Mirr}$ flows). A second switch S2 couples the drain of M3 to ground. Also, the two switches S1 and S2 are driven respectively by the signals $\phi_1$ and $\phi_2$. As mentioned above, the circuit sensor 37 operates as sensor, according to the equations above, with S1 closed (S2 open) the drain of the compensation pMOS transistor MP5 is coupled to node B, while with S1 open (S2 closed) the drain of the compensation pMOS transistor MP5 is brought to ground, therefore the current in MP5 switches between $I_{Mirr}$ and zero with duty cycle D.

A second nMOS switched pair comprises a first switch S4 coupling node A to a second bias current generator B2 generating a second bias current $I_{B2}$, and a second switch S3 coupling the output of the second bias current generator B2 to ground. The two switches S4 and S3 are driven by respective signals $\phi_1$ and $\phi_2$, where $\phi_2$ is the signal driving the power MOS, with duty cycle D, and $\phi_1 = \overline{\phi_2}$, i.e. with duty cycle 1−D.

Using a switching frequency $f_{sw}$, for the phase signals $\phi_1$ and $\phi_2$ which is much higher than the current sensor bandwidth, it is possible to notice that during each switching period, the compensation current $I_{Mirr}$ is equal to zero, since the current flowing in the drain in the compensation pMOS transistor MP5, current $I_{MP5}$, is directed to ground, for a period of $$\frac{D}{f_{sw}}$$

and is equal to current $I_{MP5}$ for the remaining part of the period (1−D). This means that the presence of the switches S1 and S2 can be seen as an attenuation of a factor (1−D) between the average drain current of the compensation pMOS transistor MP5 and the average compensation current $I_{mirr}$, so that $I_{MP5}(1-D) = I_{Mirr}$.

Looking at the formula above, it is possible to notice that the DC current on the compensation pMOS transistor MP5 depends on the average current on the load, in particular becomes zero when no current is flowing to the output load branch. This may be a problem since it may slow down the response during a fast load variation due to the delay required for the compensation pMOS transistor MP5 to be turned on. To avoid this scenario, the second bias current generator B2 generating the second bias current $I_{B2}$ is added. Such second bias current generator B2 injects an offset current in node A and acts as a minimum signal for the loop to compensate, thus guarantees a minimum compensation current $I_{mirr}$ to be always present. This offset current in node A is removed after mirroring the signal of the compensation pMOS transistor MP5. The additional switches S4 and S3, driven by $\phi_1$ and $\phi_2$ respectively, are inserted so that the value of this bias current on the compensation pMOS transistor MP5 is independent with respect to the duty cycle D, being thus easier to correctly remove. By calculating the transfer function, it is obtained that the offset current injected in node A is $I_{B2}(1-D)$ which is compensated by the compensation current $I_{Mirr}$. This means that the current flowing in the compensation pMOS transistor MP5 is $$I_{MP5} = \frac{I_{Mirr}}{1-D} = I_{B2}.$$

Thus, a variable gain $$\frac{V_{out}}{V_{in}} = \frac{1}{1-D}$$

is generated adding the MOS switched pair S1, S2 and S3, S4 driven by $\phi_1$ and $\phi_2$, where $\phi_2$ is the signal driving the power MOS (D), and $\phi_1 = \overline{\phi_2}(1-D)$. If the switching frequency of such signals is much higher than the bandwidth of the circuit, the steady state value of the current of transistor MP5 is:

$$I_{MP5} = \frac{I_{Mirr}}{(1-D)}. \qquad (15)$$

The switching frequency of the driving signal $\phi_1$ is the same of the PWM switching frequency $f_{sw}$ in the driving PWM signal q(t). This means that it possible to design the circuit with a bandwidth comparable or higher than the one of the converter so that the overall transient response is not degraded.

Thus, the load current $I_{load}$ is estimated by a current sensing circuit, using sensor circuit 37, comprising a sense resistance $R_{sense}$ inserted in the path of the load current $I_{load}$. Without switches S1, S2, S3, S4, thus with S1 and S3 closed, the sensing circuit 37 applies a given gain, measured at the node representing the gate of the compensation transistor MP5, which can be calculated as $Av0 \approx gm(MN6)*ro(MP2)$. By driving the switched pairs S1, S2 and S3, S4 with complementary logic signals $\phi_1$ and $\phi_2$, $\phi_1 = \overline{\phi_2}(1-D)$ at the switching frequency fsw, this makes the gain switch between Av0 and zero according to the duty cycle D. This corresponds to applying a variable gain to the load current $I_{load}$ proportional to the inverse of one minus the duty cycle D (i.e., the duty cycle of the negated logical signal $\phi_1$).

Thus, the converter described herein includes that the load current is estimated by a current sensing circuit 37 comprising a sense resistance $R_{sense}$ inserted in the path of the load current Iload, in particular applying a variable gain to the load current proportional to the inverse of one minus the duty cycle D.

More specifically the current sensing circuit comprises two cascoded mirror arrangements CM1 and CM2 whose common input at the sources of transistors MN2 and MN3 is coupled to the output of a current generator CS1 supplying a bias current $I_{B1}$, and whose output branches at the sources of transistors MN1 and MN4 are coupled respectively to the input at the source of transistor MP1, and to the output at the source of transistor MP2, of a further current mirror CS2 at which output is also formed an output signal of the sensing circuit. The terminals J, K of said sense resistance $R_{sense}$ are coupled, in particular through respective components presenting a same fixed resistance, such as transistors M1 and M2 biased by voltage VB or resistors, respectively to each of said two cascoded mirror arrangements CM1 and CM2, in particular to their outputs. Said load sensor 37 further comprises a compensation arrangement comprising a compensation transistor MP5 being coupled to the output node B of one of the cascaded mirror arrangements CM2 to supply a compensation current $I_{Mirr}$.

According to embodiments, the load sensor 37 includes a switching network with switches S1, S2, operating under a control signal $\phi_1$, $\phi_2$ at the switching frequency $f_{sw}$ with its duty cycle D, selectively coupling the compensation circuit arrangement (i.e., transistor MP5) to such output node B. The switching network switches S1, S2 selectively couple (i.e., couple and decouple) the transistor MP5 to node B, in particular by the switch S1 operating at the switching frequency $f_{sw}$ with its duty cycle 1−D. Switch S2 is additionally provided to couple the transistor MP5 to ground while S1 is open.

Further, said load sensor 37 circuit comprises a bias current generator B2 coupled to the output terminal node A of the first cascoded mirror arrangement CM1 to supply a further bias current and a further switching network switches S3, S4, driven by the same signal of the first switching network, switching the coupling of said bias current generator B2 to said output terminal node A, so that the further bias current and the compensation current are coupled and decoupled in the same time intervals. The switching network switches S3, S4 selectively couple (i.e., couple and decouple) the generator B2 to node A, in particular by the switch S4 operating at the switching frequency $f_{sw}$ with its duty cycle 1−D. Switch S3 is additionally provided to couple the generator B2 to ground while switch S4 is open.

It is underlined that the load sensor arrangement described in FIG. 4 represents a solution in general to obtain a sensing arrangement working with a sense resistance, which can be applied also to other circuits using a sense resistance different from the time based boost DC-DC converter apparatus here described.

As indicated above, also an estimation of the efficiency of the converter is provided to the variable gain block. One possible solution to provide such an estimation could be performing an estimation based on the real time sensing of the parameters involved (inductance current, MOS on-resistance, inductance ESR etc.). This solution, despite being very precise, would require a large effort and additional components that increase the overall converter area. In a preferred embodiment, it is used a one-time estimation of the minimum efficiency based on the worst case scenario ($I_{Load,max}$, $V_{in,min}$, $V_{out,max}$), which is used for all the cases.

Defining the output steady state error $V_\epsilon$, it is possible to write:

$$V_\epsilon = nR_T I_L - \frac{nR_T I_{Load}}{(1-D)\eta} \to 0. \quad (16)$$

Considering an error in the estimation of the efficiency $\eta_\epsilon$ it can be substituted in equation (16) to obtain:

$$V_\epsilon = nR_T I_L - \frac{nR_T I_{Load}}{(1-D)(\eta + \eta_\epsilon)} \approx nR_T I_L - \frac{nR_T I_{Load}}{(1-D)\eta}\left(1 - \frac{\eta_\epsilon}{\eta}\right) = \frac{nR_T I_{Load} \eta_\epsilon}{(1-D)\eta^2}. \quad (17)$$

The magnitude of the error in equation (17) linearly depend on the efficiency error which in turn depend on working conditions. In particular, when the term $$\frac{nR_T I_{Load}}{(1-D)\eta^2}$$

in equation (17) is at its maximum, $\eta_\epsilon \to 0$. On the other hand, the maximum $\eta_{\epsilon,max}$ happens for minimum load current $I_{load} \to 0$ so that the output steady state error $V_\epsilon$ in equation (17) still tends to zero. The described solution thus allows to have a boost converter with an enlarged bandwidth, typically limited by the position of the right half plane zero, compensating also the poor regulation drawback of known prior art (i.e., compensate the right half plane zero but maintains also a low output steady state error $V_\epsilon$, by injecting the AC component of the inductor current to compensate for the DC part).

This is obtained by a time-based control loop, which may allow to reduce die size and increase switching frequency of the DC-DC converter.

The described solution also advantageously operates with the load current to estimate the inductor current, by providing a novel wide band load current sensor, which provides an estimate of the inductor current taking in account the duty cycle of the switching frequency.

The claims are an integral part of the technical teaching of the disclosure provided herein.

Of course, without prejudice to the principle of the invention, the details of construction and the embodiments may vary widely with respect to what has been described and illustrated herein purely by way of example, without thereby departing from the scope of the present invention, as defined by the ensuing claims.

The invention claimed is:

1. A time based boost DC-DC converter apparatus, comprising:
   an inductor coupled to receive an input voltage;
   a first switch coupled between a terminal of the inductor and ground and controlled by a first pulse width modulation (PWM) signal;
   a second switch coupled between said terminal of the inductor and an output node and controlled by a second PWM signal;
   a first current sensing circuit configured to sense a current flowing in the inductor and generate a first attenuated current signal;
   a second current sensing circuit configured to sense said current flowing in the inductor and generate a second attenuated current signal;
   a first transconductance circuit configured to generate a first differential signal dependent on a difference between a voltage at the output node and a reference voltage;
   first summing circuitry configured to add and subtract the first attenuated current signal to and from said first differential signal to generate first and second differential oscillator control signals;
   a second transconductance circuit configured to generate a second differential signal dependent on a difference between said voltage at the output node and said reference voltage;
   second summing circuitry configured to add and subtract the second attenuated current signal to and from said second differential signal to generate first and second differential delay control signals;
   a first oscillation circuit configured to generate a first oscillating signal dependent on the first differential oscillator control signal;
   a first delay line receiving the first oscillating signal, applying a delay dependent on the first differential delay control signal, and outputting a first delayed oscillating signal;
   a second oscillation circuit configured to generate a second oscillating signal dependent on the second differential oscillator control signal;
   a second delay line receiving the second oscillating signal, applying a delay dependent on the second differential delay control signal, and outputting a second delayed oscillating signal; and
   a phase detector circuit configured to determine a phase difference between the first and second delayed oscillating signals and generate said first and second PWM signals.

2. The converter apparatus of claim 1, further comprising:
   a third current sensing circuit configured to sense a current flowing at the output node and generate a third attenuated current signal;
   a fourth current sensing circuit configured to sense said current flowing at the output node and generate a fourth attenuated current signal;
   wherein said first summing circuitry is further configured to add and subtract the third attenuated current signal to and from said first differential signal to generate said first and second differential oscillator control signals; and
   wherein said second summing circuitry is further configured to add and subtract the fourth attenuated current signal to and from said second differential signal to generate said first and second differential delay control signals.

3. The converter apparatus of claim 2, wherein said first transconductance circuit generates said first differential signal on first and second differential outputs, and wherein said first summing circuitry adds the first attenuated current signal to and subtracts the third attenuated current signal from said first differential output, and wherein said first summing circuitry adds the third attenuated current signal to and subtracts the first attenuated current signal from said second differential output.

4. The converter apparatus of claim 2, wherein said second transconductance circuit generates said second differential signal on third and fourth differential outputs, and wherein said second summing circuitry adds the second attenuated current signal to and subtracts the fourth attenuated current signal from said third differential output, and wherein said second summing circuitry adds the fourth attenuated current signal to and subtracts the second attenuated current signal from said fourth differential output.

5. The converter apparatus of claim 2, further comprising a variable gain circuit receiving the sensed current flowing at the output node, the input voltage and the reference voltage and configured to generate a current signal indicative of average current flowing in the inductor, said third current sensing circuit applying a first attenuation to the current signal to generate the third attenuated current signal, and said fourth current sensing circuit applying a second attenuation to the current signal to generate the fourth attenuated current signal.

6. The converter apparatus of claim 5, wherein said first current sensing circuit applies said first attenuation to the sensed current flowing in the inductor to generate the first attenuated current signal, and wherein said second current sensing circuit applies said second attenuation to the sensed current flowing in the inductor to generate the second attenuated current signal.

7. The converter apparatus of claim 1, wherein said first transconductance circuit generates said first differential signal on first and second differential outputs, and wherein said first summing circuitry adds the first attenuated current signal to said first differential output, and wherein said first summing circuitry subtracts the first attenuated current signal from said second differential output.

8. The converter apparatus of claim 1, wherein said second transconductance circuit generates said second differential signal on third and fourth differential output, and wherein said second summing circuitry adds the second attenuated current signal to said third differential output, and wherein said second summing circuitry subtracts the second attenuated current signal from said fourth differential output.

9. The converter apparatus of claim 1, wherein said first and second PWM signals are a same PWM signal.

10. The converter apparatus of claim 1, wherein said first and second PWM signals are opposite phase signals.

11. A time based boost DC-DC converter apparatus, comprising:
    an inductor coupled to receive an input voltage;
    a first switch coupled between a terminal of the inductor and ground and controlled by a first pulse width modulation (PWM) signal;
    a second switch coupled between said terminal of the inductor and an output node and controlled by a second PWM signal;

a first current sensing circuit configured to sense a current flowing at the output node to a load and generate a first attenuated current signal;

a second current sensing circuit configured to sense said current flowing at the output node to the load and generate a second attenuated current signal;

a first transconductance circuit configured to generate a first differential signal dependent on a difference between a voltage at the output node and a reference voltage;

first summing circuitry configured to add and subtract the first attenuated current signal to and from said first differential signal to generate first and second differential oscillator control signals;

a second transconductance circuit configured to generate a second differential signal dependent on a difference between said voltage at the output node and said reference voltage;

second summing circuitry configured to add and subtract the second attenuated current signal to and from said second differential signal to generate first and second differential delay control signals;

a first oscillation circuit configured to generate a first oscillating signal dependent on the first differential oscillator control signal;

a first delay line receiving the first oscillating signal, applying a delay dependent on the first differential delay control signal, and outputting a first delayed oscillating signal;

a second oscillation circuit configured to generate a second oscillating signal dependent on the second differential oscillator control signal;

a second delay line receiving the second oscillating signal, applying a delay dependent on the second differential delay control signal, and outputting a second delayed oscillating signal; and a phase detector circuit configured to determine a phase difference between the first and second delayed oscillating signals and generate said first and second PWM signals.

12. The converter apparatus of claim 11, further comprising:

a third current sensing circuit configured to sense a current flowing in the inductor and generate a third attenuated current signal;

a fourth current sensing circuit configured to sense said current flowing in the inductor and generate a fourth attenuated current signal;

wherein said first summing circuitry is further configured to add and subtract the third attenuated current signal to and from said first differential signal to generate said first and second differential oscillator control signals; and wherein said second summing circuitry is further configured to add and subtract the fourth attenuated current signal to and from said second differential signal to generate said first and second differential delay control signals.

13. The converter apparatus of claim 12, wherein said first transconductance circuit generates said first differential signal on first and second differential outputs, and wherein said first summing circuitry adds the first attenuated current signal to and subtracts the third attenuated current signal from said first differential output, and wherein said first summing circuitry adds the third attenuated current signal to and subtracts the first attenuated current signal from said second differential output.

14. The converter apparatus of claim 12, wherein said second transconductance circuit generates said second differential signal on third and fourth differential outputs, and wherein said second summing circuitry adds the second attenuated current signal to and subtracts the fourth attenuated current signal from said third differential output, and wherein said second summing circuitry adds the fourth attenuated current signal to and subtracts the second attenuated current signal from said fourth differential output.

15. The converter apparatus of claim 12, further comprising a variable gain circuit receiving the sensed current flowing at the output node, the input voltage and the reference voltage and configured to generate a current signal indicative of average current flowing in the inductor, said third current sensing circuit applying a first attenuation to the current signal to generate the third attenuated current signal, and said fourth current sensing circuit applying a second attenuation to the current signal to generate the fourth attenuated current signal.

16. The converter apparatus of claim 15, wherein said first current sensing circuit applies said first attenuation to the sensed current flowing in the inductor to generate the first attenuated current signal, and wherein said second current sensing circuit applies said second attenuation to the sensed current flowing in the inductor to generate the second attenuated current signal.

17. The converter apparatus of claim 11, wherein said first transconductance circuit generates said first differential signal on first and second differential outputs, and wherein said first summing circuitry adds the first attenuated current signal to said first differential output, and wherein said first summing circuitry subtracts the first attenuated current signal from said second differential output.

18. The converter apparatus of claim 11, wherein said second transconductance circuit generates said second differential signal on third and fourth differential output, and wherein said second summing circuitry adds the second attenuated current signal to said third differential output, and wherein said second summing circuitry subtracts the second attenuated current signal from said fourth differential output.

19. The converter apparatus of claim 11, wherein said first and second PWM signals are a same PWM signal.

20. The converter apparatus of claim 11, wherein said first and second PWM signals are opposite phase signals.

* * * * *